US012734845B2

(12) United States Patent
Yoshizumi et al.

(10) Patent No.: US 12,734,845 B2
(45) Date of Patent: Sep. 15, 2026

(54) TIRE

(71) Applicant: SUMITOMO RUBBER INDUSTRIES, LTD., Kobe (JP)

(72) Inventors: Takuma Yoshizumi, Kobe (JP); Naoya Sofue, Kobe (JP); Daichi Aoki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 61 days.

(21) Appl. No.: 18/277,720

(22) PCT Filed: Feb. 17, 2022

(86) PCT No.: PCT/JP2022/006414
§ 371 (c)(1),
(2) Date: Aug. 17, 2023

(87) PCT Pub. No.: WO2022/181442
PCT Pub. Date: Sep. 1, 2022

(65) Prior Publication Data

US 2024/0131867 A1 Apr. 25, 2024
US 2024/0227447 A9 Jul. 11, 2024

(30) Foreign Application Priority Data

Feb. 25, 2021 (JP) ................................ 2021-028029

(51) Int. Cl.
*B60C 5/14* (2006.01)
*B60C 1/00* (2006.01)
*B60C 19/00* (2006.01)

(52) U.S. Cl.
CPC .............. *B60C 5/14* (2013.01); *B60C 1/0008* (2013.01); *B60C 19/00* (2013.01); *B60C 2200/04* (2013.01)

(58) Field of Classification Search
CPC ......... B60C 5/14; B60C 1/0008; B60C 19/00; B60C 2200/04; B60C 2019/004
See application file for complete search history.

(56) References Cited

U.S. PATENT DOCUMENTS 5,573,611 A * 11/1996 Koch .................. B60C 23/0493 73/146
2006/0270775 A1* 11/2006 Miyazaki .................. C08L 9/00 524/502

(Continued)

FOREIGN PATENT DOCUMENTS

EP 3711974 A1 * 9/2020 ............... B60C 1/00
JP 2004-155352 A 6/2004

OTHER PUBLICATIONS

Naprex 38 Datasheet, ExxonMobil, [retrieved on Nov. 26, 2024]. Retrieved from the Internet: < URL: https://www.mobil.com/en-cl/industrial/pds/as-xx-naprex-38> (Year: 2023).*

(Continued)

*Primary Examiner* — Justin R Fischer
*Assistant Examiner* — Brendon Charles Darby
(74) *Attorney, Agent, or Firm* — Birch, Stewart, Kolasch & Birch, LLP

(57) ABSTRACT

A pneumatic tire (1) includes: a tread portion (2) including a land portion (24) divided by a plurality of main grooves (22) formed on a tread surface (21); an inner liner (7) constituting a tire inner surface (7A) on an inner side of the tread portion (2); and a mount member (10) which is provided on the tire inner surface (7A), and to which electric equipment can be attached. In the pneumatic tire (1), acetone extraction amount (AE2) of a rubber composition constituting the inner liner (7) is larger than acetone extraction amount AE1 of a rubber composition constituting the mount member (10).

13 Claims, 4 Drawing Sheets

(56) References Cited

U.S. PATENT DOCUMENTS

2010/0212791 A1* 8/2010 Incavo ................ B60C 23/0493
235/487
2014/0116594 A1* 5/2014 Miyazaki ............. B60C 1/0008
524/65
2017/0057304 A1* 3/2017 So ....................... B60C 23/0493

OTHER PUBLICATIONS

International Search Report for PCT/JP2022/006414 mailed on Mar. 22, 2022.
Written Opinion of the International Searching Authority for PCT/JP2022/006414 mailed on Mar. 22, 2022.

* cited by examiner

【FIG.1】
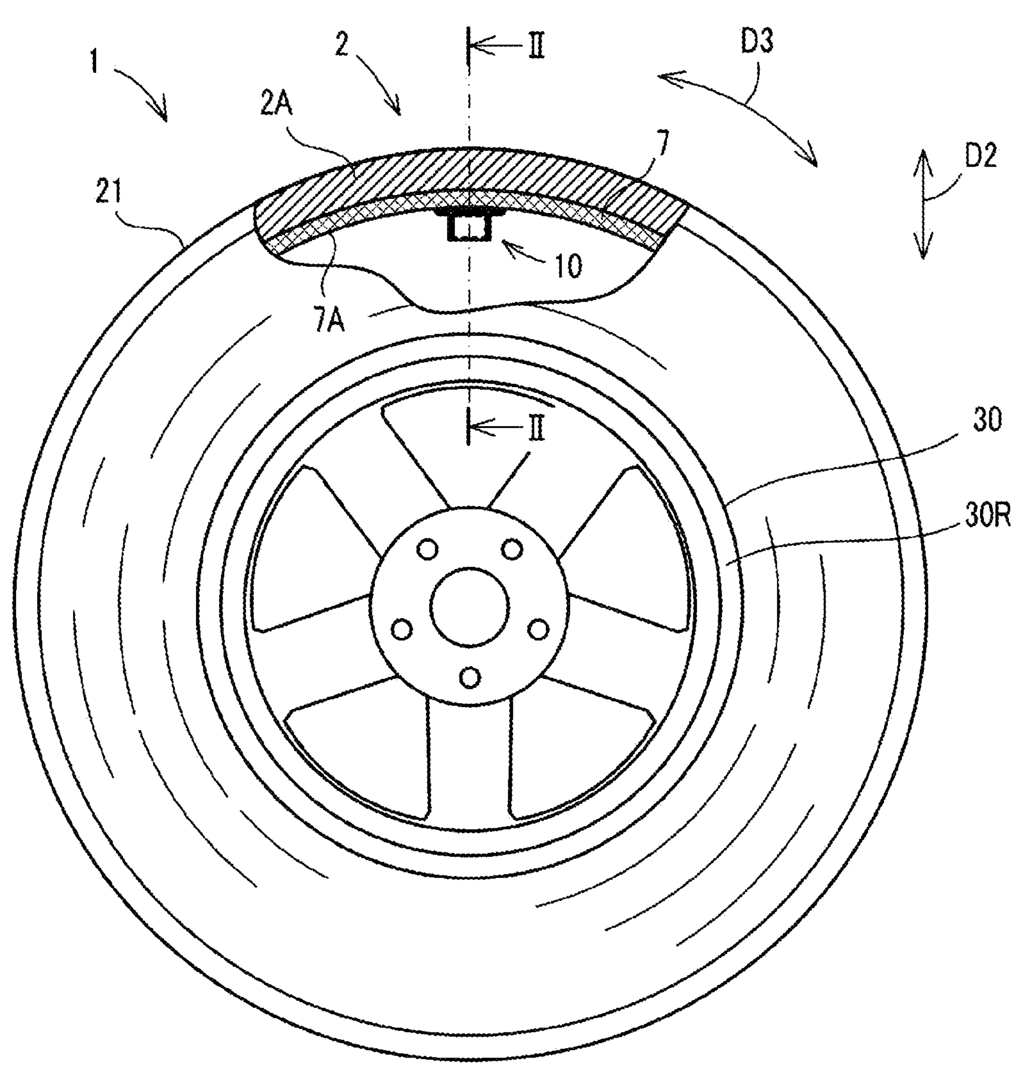

【FIG.2】
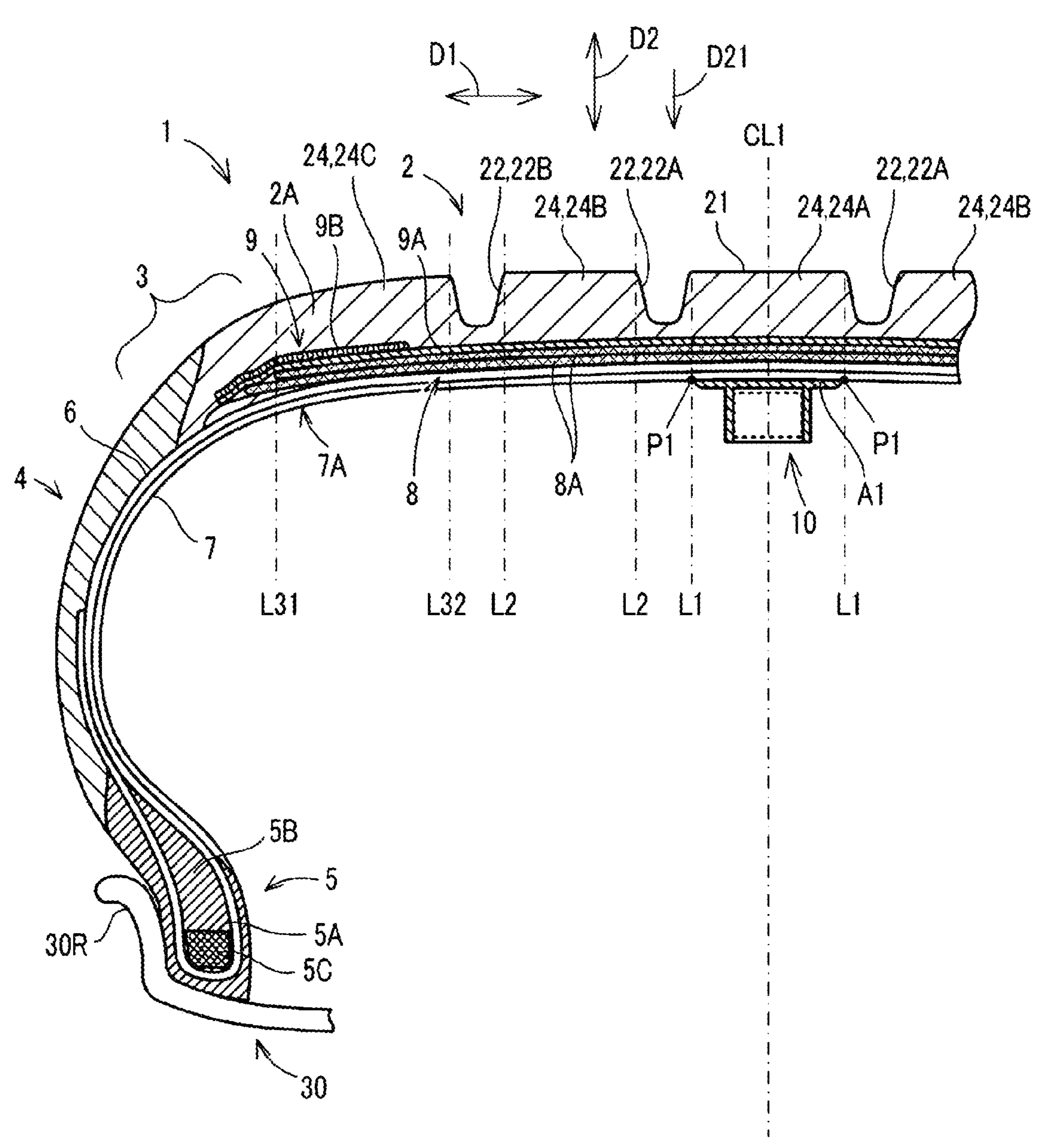

【FIG.3A】
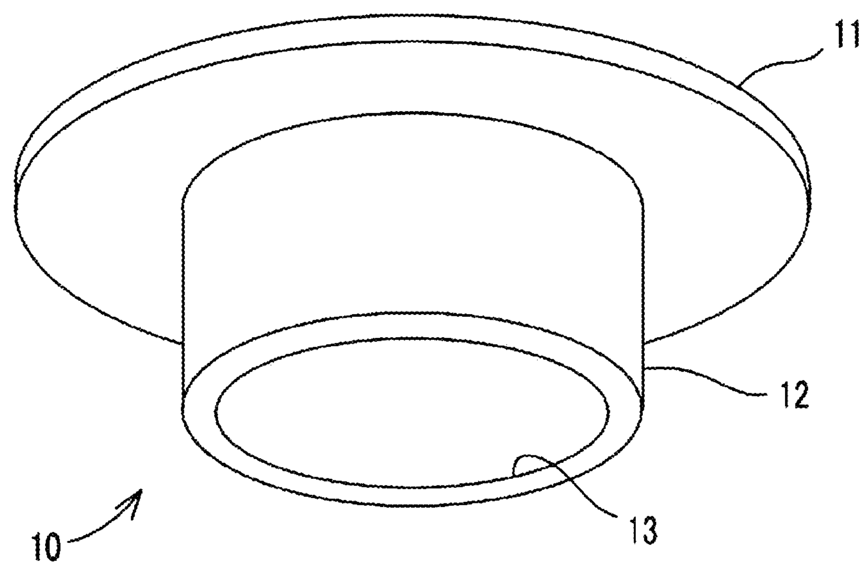
【FIG.3B】
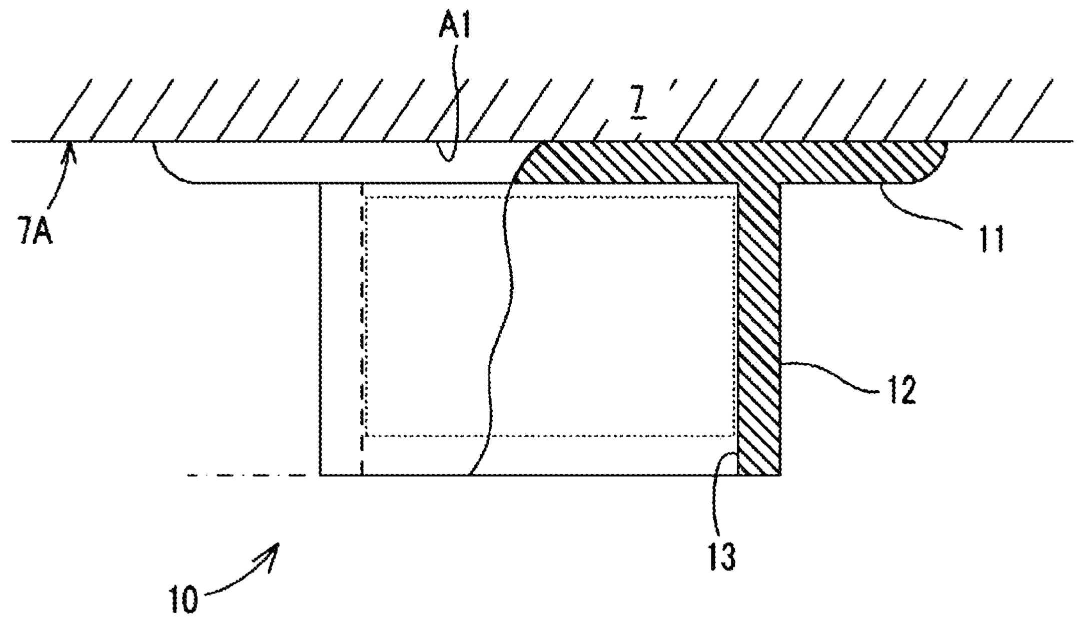

【FIG.4A】
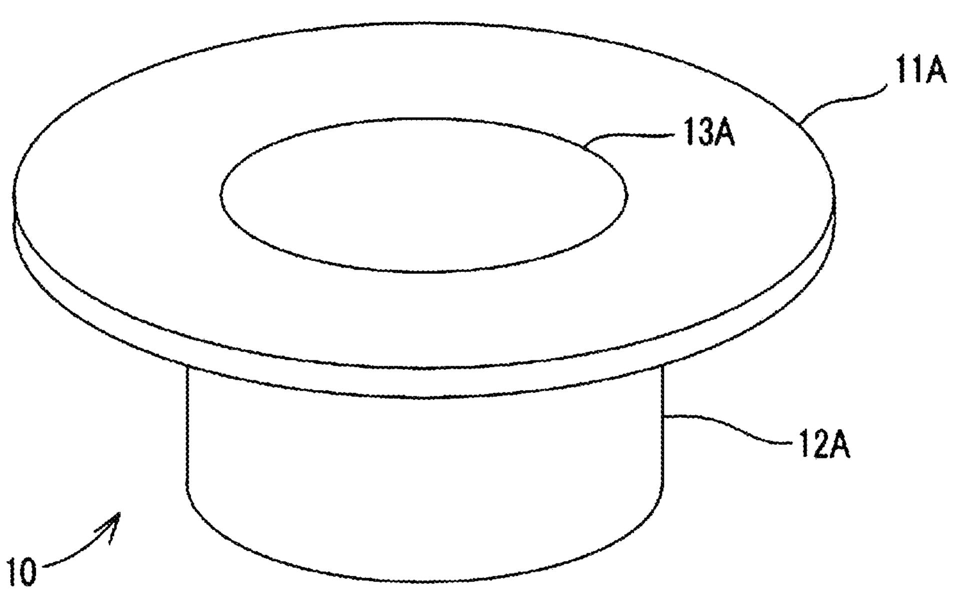
【FIG.4B】
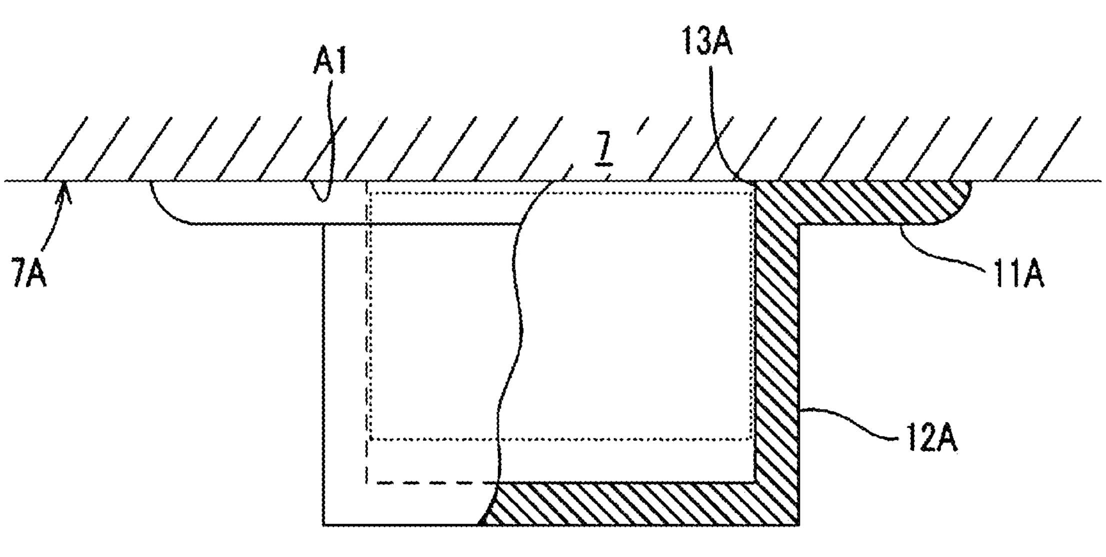

TIRE

TECHNICAL FIELD

The present disclosure relates to a tire mounted on a vehicle.

BACKGROUND ART

Conventionally, there has been proposed a tire pressure monitoring system (TPMS) for detecting and monitoring an air pressure (tire pressure) of a tire mounted on a vehicle (see PTL 1). The tire is attached with a sensor unit composed of: a sensor configured to detect a tire pressure; and a transmitter configured to transmit a detection value of the tire pressure. The tire pressure monitoring system monitors the change of the tire pressure based on a signal transmitted from the sensor unit.

CITATION LIST

Patent Literature

[PTL 1] Japanese Patent Application Publication No. 2004-155352

SUMMARY OF THE INVENTION

Problems to be Solved by the Invention

Meanwhile, in recent years, for safe and comfortable driving of a vehicle, it is considered important to appropriately detect and manage tire information that include not only the tire pressure, but temperature or vibration of the tire, and wear state of a tread portion of the tire. To detect the tire information, electric equipment such as a sensor for detecting the tire information may be attached to the tire. To acquire the tire information accurately, the electric equipment is preferably attached to a tire inner surface. However, in a case where the electric equipment is attached to the tire inner surface, when the tire is used for a long period, the air permeation resistance at a part where the electric equipment is attached to an inner liner constituting the tire inner surface and its surroundings may be deteriorated and what is called air leak may occur thereat.

It is an object of the present disclosure to, in a tire including a mount member to which electric equipment such as a sensor can be attached, prevent a reduction of air leak resistance of an inner liner.

Solution to the Problems

A tire according to an aspect of the present disclosure includes: a tread portion constituting a tire surface; an inner liner constituting a tire inner surface; and a mount member which is provided on the tire inner surface, and to which electric equipment can be attached. Each of a first rubber composition constituting the mount member and a second rubber composition constituting the inner liner contains a plasticizer. In the tire, acetone extraction amount AE2 of the second rubber composition is larger than acetone extraction amount AE1 of the first rubber composition.

With the above-described configuration of the tire, even when the plasticizer contained in the rubber composition of the mount member bleeds due to a long use, the plasticizer hardly transfers to the inner liner. This prevents the part of the inner liner to which the mount member is mounted and its surroundings from becoming softer than the other parts. As a result, it is possible to prevent a reduction of air permeation resistance due to softening of the part, and prevent a reduction of air leak resistance at the part.

Advantageous Effects of the Invention

According to the present disclosure, it is possible to, in a tire including a mount member to which electric equipment such as a sensor can be attached, prevent a reduction of air leak resistance of an inner liner.

BRIEF DESCRIPTION OF THE DRAWINGS

FIG. 1 is a side diagram of a tire according to an embodiment of the present disclosure.

FIG. 2 is a partial cross-sectional diagram of the tire, showing a cross section taken along a plane II-II shown in FIG. 1.

FIG. 3A is a schematic diagram showing an example of a mount member attached to the tire.

FIG. 3B is a schematic diagram showing an example of the mount member attached to the tire.

FIG. 4A is a schematic diagram showing another example of the mount member attached to the tire.

FIG. 4B is a schematic diagram showing another example of the mount member attached to the tire.

DESCRIPTION OF EMBODIMENTS

The following describes an embodiment of the present disclosure with reference to the accompanying drawings. It should be noted that the following embodiment is an example of a specific embodiment of the present disclosure and should not limit the technical scope of the present disclosure.

FIG. 1 is a side diagram of a pneumatic tire 1 (hereinafter, merely referred to as "tire 1") according to an embodiment of the present disclosure, viewed from a side thereof. FIG. 2 is a cross-sectional diagram of the tire 1 taken along a cut plane II-II shown in FIG. 1. FIG. 1 partially shows a cross-sectional structure of an equator plane CL1 (see FIG. 2). Here, an up-down direction when viewed on the paper in FIG. 1 and FIG. 2 is a radial direction D2 of the tire 1. A left-right direction when viewed on the paper in FIG. 2 is a width direction D1 of the tire 1. In addition, an arrow D3 shown in FIG. 1 is a peripheral direction of the tire 1. It is noted that since the tire 1 is formed symmetrical to the width direction D1 with respect to the equator plane CL1, FIG. 2 shows a partial cross-sectional diagram of the tire 1, omitting the other part.

The tire 1 has a rubber material as a main component and is mainly used mounted on a vehicle such as an automobile. As shown in FIG. 1 and FIG. 2, the tire 1 is built in a rim 30R of a wheel 30. The rim 30R is a normal rim that is described below. The tire 1 is a pneumatic tire in which air is filled in a hollow part between the rim 30R and an inner surface 7A of the tire 1. The inner pressure of the inside of the tire 1 is adjusted to a normal inner pressure that is described below.

In the present specification, a state where the inner pressure of the tire 1 built in the rim 30R is adjusted to the normal inner pressure and no load is applied to the tire 1, is referred to as a normal state. FIG. 1 and FIG. 2 show the tire 1 in the normal state, mounted on the wheel 30. In the present embodiment, unless specifically mentioned, shapes of the tire 1 and each part thereof are shapes in the normal state, and the dimension and angle of the tire 1 and each part thereof are measured in the normal state.

Here, the normal rim is a rim specified by a standard on which the tire 1 is based. Specifically, the normal rim is the "standard rim" specified by a standard (JATMA standard) of JATMA (The Japan Automobile Tyre Manufacturers Association, Inc.), the "design rim" specified by a standard (TRA standard) of TRA (The Tire and Rim Association, Inc.), and the "measuring rim" specified by a standard (ETRTO standard) of ETRTO (European Tyre Rim Technical Organisation).

The normal inner pressure is an inner pressure specified by a standard on which the tire 1 is based. Specifically, the normal inner pressure is the "maximum air pressure" specified by the JATMA standard, is the "maximum value" shown in "Tire load limits at various cold inflation pressures" of the TRA standard, and is "inflation pressure" in the ETRTO standard.

The tire 1 according to the present embodiment is suitably used as a radial tire for automobiles. It is noted that the tire 1 is a pneumatic tire for use in a vehicle, and not limited to use in automobiles, the tire 1 may be a pneumatic tire for use in various types of vehicles such as a passenger car, a large-sized vehicle such as a truck or a bus, a motorcycle, a racing vehicle, an industrial vehicle, a special vehicle, or a vehicle for loading such as a trailer or a carriage. In addition, the tire 1 is not limited to a radial tire, but is suitably used as a bias tire, too. In particular, the tire 1 is suitably used as a tire for use in a passenger car in which various types of electric equipment such as a sensor are installed, and which is required to have high convenience and low noise property during high-speed travelling. It is noted that the tire for passenger car refers to a tire mounted on an automobile that travels with four wheels, and the maximum load capacity is 1,000 kg or less.

The maximum load capacity is not particularly limited as far as it is 1,000 kg or less, but in general, as the maximum load capacity increases, the tire weight tends to increase, a vibration that occurs to a tread portion 2 of the tire 1 increases, and the noise during travelling tends to increase. As a result, the maximum load capacity is preferably 900 kg or less, more preferably 800 kg or less, and still more preferably 700 kg or less.

In addition, from a viewpoint of alleviating the vibration at the tread portion 2, the tire weight of the tire 1 is preferably 20 kg or less, more preferably 15 kg or less, and still more preferably 12 kg or less, 10 kg or less, or 8 kg or less. It is noted that the tire weight includes weights of the electric equipment and a mount member 10 described below, and in a case where sealant or sponge is provided in an inner space part of the tire 1, the tire weight includes the weight thereof, as well.

As shown in FIG. 2, the tire 1 includes the tread portion 2, a pair of shoulder portions 3 provided at opposite positions of the tread portion 2 in the width direction D1, a pair of side wall portions 4 that extend from the shoulder portions 3 in a center direction D21 directed toward the center axis of the tire 1 (inner side in the radial direction D2), and a pair of bead portions 5 located at ends of the side wall portions 4 on the side of the center direction D21.

Furthermore, the tire 1 includes: a carcass 6 (an example of a carcass portion of the present disclosure) that extends from the tread portion 2 to bead cores 5A of the bead portions 5 via the shoulder portions 3 and the side wall portions 4; an inner liner 7 that constitutes the inner surface 7A of the tire 1; a belt portion 8 and a band portion 9 that are disposed at the inside of the tread portion 2 in the radial direction D2; and a mount member 10 mounted to the inner surface 7A of the tire 1 (namely, the inner surface 7A of the inner liner 7).

The tread portion 2 is configured to contact the road surface during travelling of the vehicle. The tread portion 2 includes a tread rubber 2A that is composed of a vulcanized rubber composition (vulcanized rubber). The outer surface of the tread portion 2 is a tread surface 21 (an example of a tire surface) being a contact surface to contact the road surface. In the present embodiment, the tread surface 21 is an approximately flat surface with respect to the width direction D1. That is, the tire 1 is formed such that the tread portion 2 is in a flat shape with respect to the width direction D1.

A rubber composition that constitutes the tread rubber 2A includes a rubber component and additives such as: a filler (a reinforcing agent) such as carbon black or silica; oil; resins such as phenol resin; processing aid; stearic acid; zinc oxide; sulfur; and vulcanization accelerator.

Examples of the rubber component include general rubber materials, such as an isoprene-based rubber, a butadiene rubber (BR), a styrene-butadiene rubber (SBR), a styrene-isoprene rubber, a styrene-isoprene-butadiene rubber (SIBR), an isoprene-butadiene rubber, an acrylonitrile-butadiene rubber (NBR), an acrylonitrile-styrene-butadiene rubber, a chloroprene rubber (CR), or chlorosulfonated polyethylene. Examples of the isoprene-based rubber include natural rubber (NR), epoxidized natural rubber (ENR), isoprene rubber (IR), reformed NR, modified NR, and modified IR. In the rubber component, one of the above-mentioned rubber materials may be used alone, or two or more of the rubber materials may be used in combination, blended at a predetermined blend ratio.

A tread pattern is formed on the tread surface 21 so that each of tire performances such as grip performance, braking performance, drainage function, and wear suppression is exhibited. The tread pattern is formed of a plurality of recessed grooves formed on the tread surface 21. On the tread surface 21, a plurality of main grooves 22 (an example of peripheral-direction grooves of the present disclosure) continuously extending in the peripheral direction D3 (see FIG. 1) of the tire 1 are formed as the recessed grooves. It is noted that, for example, a plurality of lug grooves (not shown) crossing the main grooves 22 or a plurality of sipes that are narrower in width and shallower in depth than the main grooves 22 and the lug grooves may be formed on the tread surface 21. It is noted that the recessed grooves mentioned here refer to those having more than 2.0 mm of groove width and more than 5.0 mm of groove depth.

The tread pattern formed on the tread surface 21 may be what is called a rib type pattern having a plurality of main grooves 22, or what is called a rib-lug type pattern having the main grooves 22 and the lug grooves. However, the tread portion 2 of the tire 1 is not limited to one in which any one of these patterns is formed on the tread surface 21. For example, in the tread portion 2, what is called a lug type pattern mainly having the lug grooves, or what is called a block type pattern having independent blocks, may be formed on the tread surface 21. In addition, the tread pattern may be asymmetrical to the width direction of the ground contact surface.

In the present embodiment, the tread pattern formed on the tread surface 21 is symmetrical to the width direction D1 with respect to the equator plane CL1. Specifically, as shown in FIG. 2, four main grooves 22 are formed on the tread surface 21 along the peripheral direction D3. The four main grooves 22 are disposed at predetermined intervals in the width direction D1 of the tire 1 such that two main grooves 22 are disposed in each region of the tread surface 21 outside the equator plane CL1 in the width direction D1. Accordingly, the tread portion 2 includes five land portions 24 divided in the width direction D1 by the four main grooves 22 extending along the peripheral direction D3. It is noted that although the present embodiment describes, as one example, a configuration where, as shown in FIG. 2, four main grooves 22 are formed on the tread surface 21, the present disclosure is not limited to the configuration. For example, the main grooves 22 may be located asymmetrically to the width direction D1. In addition, the number of the main grooves 22 is not limited to four, but may be less than four or five or more. In addition, one of the main grooves 22 may be positioned on the equator plane CL1.

As shown in FIG. 2, the five land portions 24 include one crown land portion 24A, two middle land portions 24B, and two shoulder land portions 24C. The shoulder land portions 24C are disposed in the vicinity of the shoulder portions 3, and are sectioned between the opposite ends of the tread portion 2 in the width direction D1 and two second main grooves 22B disposed at most outside in the width direction D1. The middle land portions 24B are sectioned between two first main grooves 22A disposed in the vicinity of the equator plane CL1 and the two second main grooves 22B. In addition, the crown land portion 24A is disposed at a center part of the tread portion 2 of the tire 1 in the width direction D1. In the present embodiment, the crown land portion 24A is disposed at a part of the tread portion 2 that crosses the equator plane CL1. For example, the crown land portion 24A occupies an area of the tread portion 2 that extends from a point crossing the equator plane CL1 in both directions of the width direction D1 by a predetermined distance. The center of the area matches the equator plane CL1 and the area corresponds to a ratio that is determined in a range of 10% to 50% of the ground contact width of the ground contact surface of the tread portion 2. For example, the ratio is preferably 30%, and more preferably 20%. In addition, the crown land portion 24A is disposed at an area of the tread portion 2 that is sectioned between the two first main grooves 22A. For example, the crown land portion 24A is sectioned to be sandwiched between the two first main grooves 22A.

The crown land portion 24A may extend straight or in a zigzag shape along the peripheral direction D3. In addition, the crown land portion 24A may, in the peripheral direction D3, obliquely extend, extend in a curved shape, or extend in an arc shape. For the crown land portion 24A to be in the above-described shape, the two first main grooves 22A located on both sides of the crown land portion 24A in the width direction D1 are each formed to extend straight, extend in a zigzag shape, obliquely extend, extend in a curved shape, or extend in an arc shape along the peripheral direction D3. In addition, the crown land portion 24A may have a plurality of blocks divided in the peripheral direction D3 by lateral grooves, such as the lug grooves, or inclined grooves, or a plurality of semi blocks divided in the peripheral direction D3 by lateral grooves or inclined grooves such as the sipes. It is noted that the land portions 24 other than the crown land portion 24A also extend along the peripheral direction D3, and are formed in the same shape as the crown land portion 24A.

It is noted that in a case where the tire 1 is for a passenger car, the groove width of the first main grooves 22A is, for example, 4.0% to 7.0% of the width of the tread portion 2. In addition, the groove width of the second main grooves 22B is, for example, 2.5% to 4.5% of the width of the tread portion 2. In addition, the groove depth of the first main grooves 22A and the second main grooves 22B is, for example, 5 mm to 10 mm.

The shoulder portions 3 correspond to corner parts of the tire 1 between the tread portion 2 and the side wall portions 4. The shoulder portions 3 are parts that connect the tread portion 2 to the side wall portions 4, and are formed in a round shape (curved shape) extending from opposite end parts of the tread portion 2 in the width direction D1 to upper end parts of the side wall portions 4.

The side wall portions 4 are composed of a vulcanized rubber composition (vulcanized rubber). The side wall portions 4 are disposed outside the carcass 6 in the width direction D1. The side wall portions 4 connect to opposite end parts, in the width direction D1, of the tread rubber 2A constituting the tread portion 2, and extend along the carcass 6 in the center direction D21. The side wall portions 4 protect the carcass 6 at the sides of the tire 1.

The carcass 6 is disposed inside the tread portion 2 and the pair of side wall portions 4, and disposed more on the side of the tread portion 2 and the pair of side wall portions 4 than the inner liner 7 is. The carcass 6 is composed of at least one carcass ply. The carcass ply is a cord layer including a large number of carcass cords (not shown) that extend in a direction crossing the equator plane CL1 of the tire 1. The carcass ply is obtained by covering these carcass cords with topping rubber made of a predetermined rubber composition (vulcanized rubber). The large number of carcass cords are arranged to align along the peripheral direction D3 of the tire 1 in a state of crossing the equator plane CL1 of the tire 1 at a predetermined angle (for example, an angle in the range of 70 to 90 degrees). As the carcass cords, for example, cords composed of organic fibers such as nylon fibers, polyester fibers, rayon fibers, and aramid fibers (hereinafter referred to as "organic fiber cords") are used.

The inner liner 7 is disposed more inside than the carcass 6 to form the inner surface 7A of the tire 1. The inner liner 7 is made of a rubber composition (vulcanized rubber) having air shutoff property, and has a role of holding the internal pressure of the tire 1.

The inner liner 7 is bonded to an inner surface of the carcass 6. It is noted that the inner liner 7 may be directly bonded to the carcass 6, or may be bonded to an insulation layer that is disposed more inside than the carcass 6 in the radial direction.

A rubber composition (second rubber composition) that constitutes the inner liner 7 includes a rubber component and additives such as: a filler (a reinforcing agent) such as carbon black or calcium carbonate; a plasticizer such as oil or resins; an anti-aging agent; a compatibilizing agent; stearic acid; zinc oxide; sulfur; a coupling agent; and a vulcanization accelerator.

As the rubber component, a rubber material mainly composed of a butyl-based rubber having excellent air permeation resistance is used. Examples of the butyl-based rubber include: a halogenated butyl rubber (X-IIR) such as a butyl rubber (IIR), a brominated butyl rubber (BR-IIR), and a chlorinated butyl rubber (CR-IIR); a copolymer of isobutylene and p-alkylstyrene; and a halide of the copolymer. Of these, from a viewpoint of improving sheet processability and air shutoff property in a good balance, the halogenated butyl rubber is preferable and the brominated butyl rubber and the chlorinated butyl rubber are more preferable. In addition, in the rubber component, one of the above-mentioned butyl-based rubbers may be used alone, or two or more of the rubber materials may be used in combination, blended at a predetermined blend ratio. It is noted that a viscoelastic material mainly composed of a plastic elastomer having a low air permeability can be applied to the rubber composition constituting the inner liner 7.

It is preferable that, as the butyl-based rubber, a normal butyl-based rubber (a butyl-based rubber other than a reclaimed butyl-based rubber) is used in combination with the reclaimed butyl-based rubber. Since the reclaimed butyl-based rubber normally has a high content of non-halogenated butyl rubber (regular butyl rubber), it is possible to secure excellent air shutoff property and vulcanization rate by using it in combination with a halogenated butyl rubber.

The total content of the butyl-based rubber in 100% by mass of the rubber component is 70% by mass or more, preferably 75% by mass or more, and still more preferably 80% by mass or more. When it is less than 70% by mass, sufficient air shutoff property may not be obtained. The total content may be 100% by mass. However, from a viewpoint of the sheet processability and the air shutoff property, the total property is preferably 95% by mass or less, and more preferably 90% by mass or less.

The content of the reclaimed butyl-based rubber in 100% by mass of the rubber component is preferably 5% by mass or more, and more preferably 8% by mass or more. When it is less than 5% by mass, the merit of using the reclaimed butyl-based rubber may not be obtained sufficiently. The content is preferably 30% by mass or less, and more preferably 25% by mass or less. When it is more than 30% by mass, the air shutoff property and the vulcanization rate may not be secured sufficiently.

From a viewpoint of improving the sheet processability and the air shutoff property in a good balance, the rubber composition constituting the inner liner 7 preferably contains isoprene-based rubber.

Examples of the isoprene-based rubber include natural rubber (NR), epoxidized natural rubber (ENR), and isoprene rubber (IR). In particular, from the viewpoint of improving the sheet processability and the air shutoff property in a good balance, NR or IR is preferable.

The NR is not particularly limited, and, for example, those commonly used in the tire industry such as SIR20, RSS #3, and TSR20 can be used. The IR is not particularly limited, and those commonly used in the tire industry can be used.

The content of the isoprene-based rubber in 100% by mass of the rubber component is preferably 5% by mass or more, and more preferably 10% by mass or more. When it is less than 5% by mass, the sheet processability and the air shutoff property may not be obtained in a good balance. The content is preferably 30% by mass or less, and more preferably 25% by mass or less. When it is more than 30% by mass, the air shutoff property of the vulcanized rubber may not be obtained sufficiently.

In the present embodiment, the rubber component contained the rubber composition constituting the inner liner 7 may contain rubber materials other than the butyl-based rubber and the isoprene-based rubber, as well. Examples thereof include diene-based rubbers such as a butadiene rubber (BR), a styrene-butadiene rubber (SBR), an ethylene-propylene-diene rubber (EPDM), a styrene-isoprene-butadiene rubber (SIBR), a chloroprene rubber (CR), and an acrylonitrile-butadiene rubber (NBR). In the rubber component of the inner liner 7, one of the above-mentioned rubber materials may be used alone, or two or more of the rubber materials may be used in combination, blended at a predetermined blend ratio.

It is preferable that the rubber composition constituting the inner liner 7 contains a filler. Specific examples of the filler include carbon black, silica, calcium carbonate, talc, alumina, clay, aluminum hydroxide, and mica. Among these, carbon black and calcium carbonate can be preferably used as a reinforcing agent, and they are preferably used in combination.

The carbon black is not particularly limited, and examples thereof include N134, N110, N220, N234, N219, N339, N330, N326, N351, N550, and N762. These may be used alone or in combination of two or more.

The carbon black may be a commercial product of, for example, Asahi Carbon Co., Ltd., Cabot Japan K.K., Tokai Carbon Co., Ltd., Mitsubishi Chemical Corporation, Lion Corporation, Nippon Steel Chemical Carbon Co., Ltd., or Columbia Carbon.

The content of the carbon black is preferably 1 part by mass or more, more preferably 3 parts by mass or more, and is preferably 50 parts by mass or less, more preferably 30 parts by mass or less, and still more preferably 10 parts by mass or less with respect to 100 parts by mass of the rubber component.

The rubber composition constituting the inner liner 7 preferably contains a plasticizer (softening agent). Specific examples of the plasticizer are described below.

The rubber composition constituting the inner liner 7 preferably contains an anti-aging agent. The anti-aging agent may be any anti-aging agent that has been generally used in the tire industry, and examples thereof include: naphthylamine anti-aging agents such as phenyl-α-naphthylamine; diphenylamine anti-aging agents such as octylated diphenylamine, and 4,4'-bis(α,α'-dimethylbenzyl)diphenylamine; p-phenylenediamine anti-aging agents such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline anti-aging agents such as 2,2,4-trimethyl-1,2-dihydroquinoline polymer; monophenolic anti-aging agents such as 2,6-di-t-butyl-4-methylphenol, and styrenated phenol; and bis-, tris-, or polyphenolic anti-aging agents such as tetrakis-[methylene-3-(3',5'-di-t-butyl-4'-hydroxyphenyl)propionate]methane. These may be used alone or in combination of two or more. In particular, the p-phenylenediamine anti-aging agents and the quinoline anti-aging agents are preferable.

The anti-aging agent may be a commercial product of, for example, Seiko Chemical Co., Ltd., Sumitomo Chemical Co., Ltd., Ouchi Shinko Chemical Industrial Co., Ltd., or Flexsys.

The rubber composition constituting the inner liner 7 preferably contains a compatibilizing agent. The compatibilizing agent may be any compatibilizing agent that has been generally used in the tire industry, and examples thereof include: non-reactive compatibilizing agents such as styrene-ethylene-butadiene block copolymer, styrene-methyl methacrylate block copolymer, ethylene-styrenegraft block copolymer, chlorinated polyethylene, a mixture of aromatic hydrocarbon-based resin and aliphatic hydrocarbon-based resin, and metallic soap of an unsaturated fatty acid; and reactive compatibilizing agents such as maleic anhydride graft polypropylene, styrene-maleic anhydride copolymer, ethylene-glycidyl methacrylate copolymer, and styrene graft copolymer to ethylene-glycidyl methacrylate copolymer. These may be used alone or in combination of two or more.

From a viewpoint of effectively reducing air permeability of the rubber composition and restricting formation of a large gap, the content of the compatibilizing agent in 100% by mass of the rubber component is preferably 5% by mass or more, more preferably approximately 5 to 15% by mass, and still more preferably approximately 5 to 10% by mass.

The stearic acid contained in the rubber composition constituting the inner liner 7 may be a conventionally known one, and examples thereof include commercial products of companies: NOF Corporation, Kao Corporation, FUJIFILM Wako Pure Chemical Corporation, and Chiba Fatty Acid Co., Ltd.

The zinc oxide contained in the rubber composition constituting the inner liner 7 may be a conventionally known one, and examples thereof include commercial products of companies: Mitsui Mining & Smelting, Toho Zinc, HakusuiTech, Seido Chemical Industry, and Sakai Chemical Industry.

The sulfur contained in the rubber composition constituting the inner liner 7 may be any sulfur that has been generally used in the tire industry, and examples thereof include: powdered sulfur, precipitated sulfur, colloidal sulfur, insoluble sulfur, highly dispersible sulfur, and soluble sulfur. These may be used alone or in combination of two or more.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The vulcanization accelerator contained in the rubber composition constituting the inner liner 7 may be any vulcanization accelerator that has been generally used in the tire industry, and examples thereof include: thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone or in combination of two or more. In particular, the sulfenamide vulcanization accelerators and the thiuram vulcanization accelerators are preferable, and it is preferable that sulfenamide vulcanization accelerator(s) and thiuram vulcanization accelerator(s) are used in combination.

The vulcanization accelerator may be a commercial product of, for example, Kawaguchi Chemical Industry Co., Ltd., Ouchi Shinko Chemical Industrial Co., Ltd., or Rhein Chemie.

In the present embodiment, the rubber composition constituting the inner liner 7 is larger than the rubber composition (first rubber composition) constituting the mount member 10 in acetone extraction amount AE. In other words, acetone extraction amount AE2 of the rubber composition of the inner liner 7 is larger than acetone extraction amount AE1 of the rubber composition of the mount member 10. The action effect of the configuration is described below.

The bead portions 5 are parts that are coupled with the wheel and fix the tire 1 to the rim 30R by the internal pressure. Each of the bead portions 5 includes a bead core 5A and an apex rubber 5B, wherein the bead core 5A is composed of a plurality of bead wires 5C made of steel. The apex rubber 5B is located outside the bead core 5A in the radial direction D2 and is, for example, made of a rubber composition (vulcanized rubber) having high rigidity. The external side of the bead core 5A and the apex rubber 5B is surrounded by the carcass ply of the carcass 6. Specifically, the carcass ply is folded from inside to outside in the width direction D1 around the bead core 5A, and extends along the outside of the bead portions 5 in the width direction D1 towards the outside in the radial direction D2. The bead core 5A and the apex rubber 5B are disposed in a part that is surrounded in this way by the carcass ply.

The belt portion 8 is a belt-like member extending in the peripheral direction D3 of the tire 1. The belt portion 8 is disposed inside the tread portion 2 in the radial direction D2 and outside the carcass 6. The belt portion 8 has a role of enhancing the synthesis of the tread portion 2 by tightening the carcass 6 in the radial direction D2. The belt portion 8 is also a reinforcing layer for reinforcing the carcass 6 together with the band portion 9 described below.

The belt portion 8 is composed of at least one belt ply 8A. In the present embodiment, the belt portion 8 includes two belt plies 8A. The belt portion 8 extends to make one round of the tire 1 in the peripheral direction D3.

Each of the belt plies 8A includes a large number of belt cords (not shown) that extend in a direction crossing the equator plane CL1 of the tire 1. Each of the belt plies 8A is obtained by covering these belt cords with topping rubber. The large number of belt cords are arranged to align along the peripheral direction D3 of the tire 1 in a state of crossing the equator plane CL1 of the tire 1 at a predetermined angle (for example, an angle in the range of 10 to 35 degrees). In the belt portion 8, each of the belt plies 8A is disposed such that the belt cords are oriented to cross each other. As the belt cords, cords made of steel (steel cords) or the organic fiber cords are used.

The band portion 9 is a belt-like member extending in the peripheral direction D3 of the tire 1. The band portion 9 is disposed inside the tread portion 2 in the radial direction D2 and outside the belt portion 8. The band portion 9 includes a full band 9A and a pair of edge bands 9B, wherein the full band 9A covers the entire belt portion 8, and the pair of edge bands 9B are disposed at positions corresponding to the opposite end parts of the tread portion 2 in the width direction D1. The band portion 9 has a role of restricting the movement of the belt portion 8 to prevent the belt portion 8 from floating up or peeling off by the centrifugal force generated during travelling of the vehicle. In addition, the band portion 9 is also a reinforcing layer for reinforcing the carcass 6 together with the belt portion 8 described above.

FIG. 3A and FIG. 3B are diagrams showing a configuration of the mount member 10. FIG. 3A is a perspective diagram of the mount member 10. FIG. 3B is a partial cross-sectional diagram of the mount member 10.

The mount member 10 is a member to which electric equipment such as a sensor for detecting temperature, vibration, pressure, acceleration or the like is attached. The mount member 10 is fixed to the inner surface 7A of the tire 1, namely, the inner surface 7A of the inner liner 7. Examples of the electric equipment other than the sensor include a relay for relaying a wireless communication or the like, and a transmitter for transmitting a predetermined signal.

As shown in FIG. 3A and FIG. 3B, the mount member 10 includes a mounting seat portion 11 and a main body portion 12, wherein the mounting seat portion 11 is fixed to the inner surface 7A, and the electric equipment is attached to the main body portion 12 in a detachable manner. The mount member 10 is obtained by integrally forming the mounting seat portion 11 and the main body portion 12 from a vulcanized rubber composition (vulcanized rubber). It is noted that a part indicated by a dotted line in FIG. 3B represents the electric equipment attached to the mount member 10.

The mount member 10 is composed of a rubber composition different from that of the inner liner 7. As the materials, other than the rubber component, to be blended into the rubber composition of the mount member 10, materials common to those of the rubber composition of the inner liner 7 may be used. That is, the rubber composition constituting the mount member 10 may include, in addition to the rubber component, additives such as: a filler (a reinforcing agent) such as carbon black, silica, or calcium carbonate; coupling agent; plasticizer such as oil or resins; anti-aging agent; stearic acid; zinc oxide; sulfur; and vulcanization accelerator. Of course, the rubber component constituting the mount member 10 may be the same as the rubber component of the inner liner 7, or may be different therefrom. That is, as the rubber component of the mount member 10, one of the above-described rubber materials applicable to the rubber component of the inner liner 7 may be used alone, or two or more of the rubber materials may be used in combination, blended at a predetermined blend ratio. For example, the rubber component of the mount member 10 may be different from that of the inner liner 7, and may be, for example, a rubber component that mainly contains: the butadiene rubber (BR) whose glass transition temperature Tg is low and which is excellent in low-temperature properties; and the acrylonitile-butadiene rubber (NBR) which is excellent in mechanical properties. In addition, the rubber component of the mount member 10 may further contain other rubber materials such as: the isoprene-based rubber; and the diene-based rubber such as a styrene-butadiene rubber (SBR), a styrene-isoprene rubber, a styrene-isoprene-butadiene rubber (SIBR), and a chloroprene rubber (CR). Of course, the mount member 10 may be composed of the same rubber component as that of the inner liner 7. It is noted that for the materials common to those of the inner liner 7, refer to explanations that have already been given above.

Examples of the rubber component include general rubber materials, such as an isoprene-based rubber, a butadiene rubber (BR), a styrene-butadiene rubber (SBR), a styrene-isoprene rubber, a styrene-isoprene-butadiene rubber (SIBR), an isoprene-butadiene rubber, an acrylonitrile-butadiene rubber (NBR), an acrylonitrile-styrene-butadiene rubber, a chloroprene rubber (CR), and chlorosulfonated polyethylene. Examples of the isoprene-based rubber include natural rubber (NR), epoxidized natural rubber (ENR), isoprene rubber (IR), reformed NR, modified NR, and modified IR. In the rubber component, one of the above-mentioned rubber materials may be used alone, or two or more of the rubber materials may be used in combination, blended at a predetermined blend ratio.

When silica and carbon black are used in combination as the filler, the total content of them in 100% by mass of the rubber component is preferably 30% by mass or more, and 150% by mass or less.

In addition, the ratio of the content of carbon black to the content of silica is preferably 50% by mass or less, preferably 25% by mass or less, and more preferably 10% by mass or less. Black carbon is higher in reinforcing ability than silica. Accordingly, when the ratio exceeds 50% by mass, a complex elastic modulus of the tread rubber 2A becomes excessively high, and there is a tendency that the low noise property during high-speed travelling becomes worse. It is noted that the ratio of the content of carbon black to the content of silica is preferably 2% by mass or more, and more preferably 4% by mass or more.

The rubber composition constituting the mount member 10 preferably contains silica. Examples of the silica include dry process silica (anhydrous silicic acid), wet process silica (hydrous silicic acid) and the like, but wet process silica is preferred because of the large number of silanol groups. It is noted that the rubber composition may contain silica of a type other than the above-mentioned types. These may be used alone or in combination of two or more.

The content of silica in 100% by mass of the rubber component is preferably 10% by mass or more, more preferably 40% by mass or more, still more preferably 60% by mass or more, particularly preferably 70% by mass or more, more particularly preferably 80% by mass or more, and most preferably 90% by mass, and is preferably 120% by mass or less, more preferably 115% by mass or less, still more preferably 110% by mass or less, particularly preferably 105% by mass or less, and most preferably 100% by mass or less.

The silica may be a commercial product of, for example, Degussa, Rhodia, Tosoh Silica Corporation, Evonik Japan, Solvay Japan, or Tokuyama Corporation.

The rubber composition constituting the mount member 10 preferably contains a silane coupling agent as well as silica. The silane coupling agent is not particularly limited, and examples thereof include: a sulfide-based silane coupling agent such as bis(3-triethoxysilylpropyl)tetrasulfide, bis(2-tiethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl) disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; a mercapto-based silane coupling agent such as 3-mercaptopropyltrimethoxysilane, 2-mercaptoethyltriethoxysilane, and NXT and NXT-Z both available from Momentive; a vinyl-based silane coupling agent such as vinyltiethoxysilane, and vinyltrimethoxysilane; an amino-based silane coupling agent such as 3-aminopropyltriethoxysilane, and 3-aminopropyltrimethoxysilane; a glycidoxy-based silane coupling agent such as γ-glycidoxypropyltriethoxysilane, and γ-glycidoxypropyltrimethoxysilane; a nitro-based silane coupling agent such as 3-nitropropyltrimethoxysilane, and 3-nitropropyltriethoxysilane; and a chloro-based silane coupling agent such as 3-chloropropyltrimethoxysilane, and 3-chloropropyltriethoxysilane. These may be used alone or in combination of two or more.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The content of silane coupling agent in 100% by mass of silica is, for example, more than 3% by mass and less than 25% by mass.

The mounting seat portion 11 is formed, for example, in a disk shape, and is formed such that its outer diameter is larger than the outer diameter of the main body portion 12. In addition, the main body portion 12 is formed in a shape of a cylinder projecting from one of disk surfaces of the mounting seat portion 11. An opening 13 is formed in a projection end surface of the main body portion 12, and the electric equipment is fitted into the main body portion 12 through the opening 13 to be held therein by the elasticity of the rubber. As the method for mounting the mounting seat portion 11 to the inner surface 7A of the tire 1, various methods can be adopted.

For example, in a possible mounting method, a skin of a mounting area A1 (mounting surface) of the inner surface 7A is removed by applying a predetermined surface processing treatment to the mounting area A1, and in that state, the mounting seat portion 11 of the mount member 10 is fixed to the mounting area A1 by being welded or adhered with an adhesive. Examples of the surface processing treatment include: a treatment of removing the mold releasing agent together with the skin by polishing the surface of the mounting area A1 of the inner surface 7A with a polishing machine; and a treatment of removing the mold releasing agent together with the skin of the surface of the mounting area A1 by irradiating a laser beam onto the surface of the mounting area A1.

In more detail, the surface processing treatment is a treatment to process and make the surface of the mounting area A1 an even surface (for example, a flat surface) by polishing with a polishing machine or irradiation of the laser beam. This improves the adhesion between the mounting area A1 and the contact surface of the mounting seat portion 11, and enhances the mounting strength of the mount member at the mounting area A1. In addition, since it also removes the mold releasing agent adhered to the mounting area A1, a strength reduction due to the mold releasing agent is prevented. As a result, the mount member 10 is more stiffly mounted to the mounting area A1.

It is noted that, before the mount member 10 is mounted, the surface processing treatment of polishing with a polishing machine or irradiation of the laser beam is preferable to be applied to an adhesion surface of the mounting seat portion 11, too. This further improves the adhesion between the adhesion surface of the mounting seat portion 11 and the mounting area A1, and further enhances the mounting strength of the mount member 10.

In addition, other examples of the method for mounting the mounting seat portion 11 include: a mounting method to vulcanize the tire 1 without applying the mold releasing agent to the mounting area A1, and then fix the mounting seat portion 11 to the mounting area A1 by welding or adhering with an adhesive; and a mounting method to join the mounting seat portion 11 to the inner surface 7A of the tire 1 before vulcanization, and then fixes the mount member 10 to the inner surface 7A by vulcanizing the tire 1 together with the mount member 10.

Here, if the fixation of the mount member 10 is not sufficient, the mounting seat portion 11 of the mount member 10 may partially peel off while the vehicle is travelling and the peeled-off part may come in contact with the inner surface 7A along with rolling of the tire 1, causing the contact sound to be sensed as an unpleasant noise. For this reason, as the surface processing treatment, a processing treatment with laser beam irradiation is preferable since it can uniformly process the surface of the mounting area A1 or the contact surface of the mounting seat portion 11 with high precision. In addition, according to the processing treatment with laser beam irradiation, a step at a boundary between a part where the treatment has been performed (surface-processed surface) and a part where the treatment has not been performed (untreated surface) can be 200 μm or less, causing a less amount of skin to be scraped than a processing treatment with polishing. It is noted that it is possible to determine whether or not the surface processing treatment with laser beam irradiation has been performed by confirming whether or not the step at the boundary between a part where the surface processing treatment has been performed (surface-processed surface) and a part where the surface processing treatment has not been performed (untreated surface) is 200 μm or less. That is, when the step at the boundary is 200 μm or less, it is determined that the surface processing treatment with laser beam irradiation has been performed; and when the step at the boundary is more than 200 μm, it is determined that another surface processing treatment has been performed.

In the present embodiment, as shown in FIG. 2, the mount member 10 is disposed on the inner surface 7A of the tire 1 at a position corresponding to a center part of the tread portion 2 in the width direction D1. In other words, the mount member 10 is disposed on the inner surface 7A of the tire 1 at a position corresponding to the above-described crown land portion 24A. Specifically, the mount member 10 is disposed on the inner surface 7A at the mounting area A1 (mounting position) corresponding to the above-described crown land portion 24A.

The mounting area A1 is an area in the inner surface 7A that is divided by two straight lines L1 that respectively pass through opposite ends of a ground contact surface of the crown land portion 24A in the width direction D1, and are perpendicular to a tread surface profile that is obtained by imaginarily connecting the surface of the crown land portion 24A. In other words, the mounting area A1 is an area in a rear surface (a surface on the inner side) of the tread portion 2, the area being surrounded by two crossing portions P1 where the two straight lines L1 that are parallel to the equator plane CL1 cross the inner surface 7A. It is noted that the straight lines L1 respectively pass through opposite ends of the crown land portion 24A in the width direction D1 and are parallel to the equator plane CL1. Here, the position corresponding to the crown land portion 24A means a position that is disposed such that the center of the mounting seat portion 11 of the mount member 10 is located in the mounting area A1, and is not limited to a position where a straight line (a straight line included in the equator plane CL1) passing through the center of the crown land portion 24A coincides with the center of the mount member 10.

It is noted that the mounting area A1 may correspond to both or either of the two middle land portions 24B. In this case, the mounting area A1 is an area in the inner surface 7A that is divided by two straight lines L2 that pass through the opposite ends of the ground contact surface of the middle land portion 24B in the width direction D1, and are perpendicular to a tread surface profile that is obtained by imaginarily connecting the surface of the middle land portion 24B. In addition, the mounting area A1 may correspond to both or either of the two shoulder land portions 24C. In this case, the mounting area A1 is an area in the inner surface 7A that is divided by a straight line L31 and a straight line L32, wherein the straight line L31 passes through an end of the ground contact surface of the tread surface 21, and the straight line L32 passes through an end of the shoulder land portion 24C on the side of the second main groove 22B and is perpendicular to the tread surface profile.

In the present embodiment, the mount member 10 is disposed at a position where a straight line (a straight line included in the equator plane CL1) that passes through the center of the crown land portion 24A coincides with the center of the mount member 10. More specifically, the mount member 10 is fixed to the inner surface 7A such that the center of the mounting seat portion 11 coincides with an intersection of: a straight line (a straight line included in the equator plane CL1) that passes through the center of the crown land portion 24A and the center of the tire 1 in the cross-sectional diagram of FIG. 2; and the inner surface 7A. Accordingly, the mount member 10 is not disposed at a position on the inner surface 7A that corresponds to the main grooves 22 formed on the tread portion 2. That is, the mount member 10 is not mounted at a position on the tread portion 2 that is in the rear of the main grooves 22.

In addition, the center of the mounting seat portion 11 is preferably within an area divided by straight lines that are perpendicular to the tread surface profile at positions of, with the equator plane CL1 as its center, 50% of the ground contact width of the ground contact surface of the tread portion 2. This is because it is considered that when the area is more outside than the positions of 50% in the width direction D1, a deformation amount of the tread portion 2 during rolling is large, and a vibration sound made by the mount member 10 becomes large.

Here, the tread surface profile is a surface shape that can be obtained by imaginarily connecting the surfaces of the land portions 24 in the normal state.

In addition, the ground contact width is the maximum position of the ground contact surface in the width direction that is obtained when the tire 1 is pressed against a flat road surface in a state of the normal inner pressure, normal load, and camper angle of 0 (zero) degrees.

It is noted that the normal load is a load specified by the standard on which the tire 1 is based. Specifically, the normal load is the "maximum load capacity" specified by the JATMA standard, the "maximum value" specified by the TRA standard in "Tire load limits at various cold inflation pressures", and the "load capacity" specified by the ETRTO standard.

It is noted that although in the present embodiment, the mount member 10 including the mounting seat portion 11 is described, the mount member 10 may not include the mounting seat portion 11, but may be composed of only the main body portion 12.

In addition, when a plurality of mount members 10 are mounted to the inner surface 7A of the tire 1, the mount members 10 are preferably arranged on the inner surface 7A at equal intervals along the peripheral direction D3. This makes it possible to keep the weight balance in the peripheral direction D3 equal when a plurality of mount members 10 are installed.

In addition, the mounting position of the mount member 10 is not limited to the mounting area A1. For example, the mount member 10 may be mounted to a position on the inner surface 7A of the tire 1 that corresponds to one of the two middle land portions 24B. In addition, the mount member 10 may be mounted to a position that corresponds to both of the two middle land portions 24B.

In addition, when two or more mount members 10 are mounted to the inner surface 7A in alignment in the width direction D1, they are preferably mounted to positions that correspond to both of the two middle land portions 24B that are disposed at equal intervals in the width direction D1 from the equator plane CL1 of the tire 1 in between. In this case, when the crown land portion 24A is present on the equator plane CL1, the mount members 10 may be mounted to positions corresponding to the crown land portion 24A. This makes it possible to keep the weight balance in the width direction D1 symmetrical to the equator plane CL1 and equal.

The mount member 10 may have any shape as far as it can be attached with the electric equipment, and, for example, may be formed as shown in FIG. 4A and FIG. 4B. Here, FIG. 4A and FIG. 4B are diagrams showing another configuration of the mount member 10. FIG. 4A is a perspective diagram of the mount member 10. FIG. 4B is a partial cross-sectional diagram of the mount member 10. The mount member 10 shown in FIG. 4A and FIG. 4B includes an annular and circular mounting seat portion 11A and a cylindrical main body portion 12A whose inner hole continues to an opening 13A of the mounting seat portion 11A. The other side of the main body portion 12A is closed. As a result, when the mounting seat portion 11A is fixed to the inner surface 7A in a state where the electric equipment is held in the main body portion 12A, the electric equipment is in a sealed state, shielded from outside.

Meanwhile, in a case where the mount member 10 attached with the electric equipment is provided on the inner surface 7A of the tire 1, when the tire 1 is used for a long period, the air permeation resistance at a part where the electric equipment is attached to the inner liner 7 and its surroundings may be deteriorated and what is called air leak may occur thereat.

On the other hand, in the present embodiment, the inner liner 7 is composed of a rubber composition that is larger in the acetone extraction amount AE than the rubber composition constituting the mount member 10. That is, it is preferable that the acetone extraction amount AE2 of the rubber composition of the inner liner 7 is larger than the acetone extraction amount AE1 of the rubber composition of the mount member 10. In other words, the acetone extraction amount AE2 of the rubber composition of the inner liner 7 and the acetone extraction amount AE1 of the rubber composition of the mount member 10 have a relationship represented as $\Delta A$ (=AE2−AE1)>0.

The acetone extraction amount AE of the rubber composition indicates the quantity of acetone extracted by an acetone extraction method conforming to JIS K6229 under normal temperature (for example, 20° C.) and normal pressure (one atmospheric pressure: 1,013 hPa). The extracted acetone is mainly a plasticizer such as oil that has softening effect to the rubber composition. The acetone extraction amount AE is expressed as a percentage that is obtained as follows: a test piece sampled from the measuring object, namely the rubber composition of the inner liner 7 or the mount member 10, is immersed in acetone for 72 hours to extract a soluble component; and 100 is multiplied by a value that is obtained by dividing the amount of change in the mass of the test piece before and after the extraction by the mass of the test piece before the extraction. Specifically, it can be obtained from the following formula.

$$\text{Acetone extraction amount } AE=\{(\text{mass of test piece before extraction}-\text{mass of test piece after extraction})/(\text{mass of test piece before extraction})\}\times 100$$

In the present embodiment, as described above, the acetone extraction amount AE2 of the inner liner 7 is larger than the acetone extraction amount AE1 of the mount member 10. It is thus considered that even when the plasticizer contained in the rubber composition of the mount member 10 bleeds due to a long use of the tire 1, the plasticizer hardly transfers to the rubber composition of the inner liner 7. This prevents the mounting area A1 of the inner liner 7 to which the mount member 10 is mounted, from becoming softer than the other parts. As a result, it is possible to prevent a reduction of air permeation resistance due to softening of a part of the mounting area A1 to which the mount member 10 is attached, and prevent a reduction of air leak resistance at the part of the inner liner 7.

In particular, the acetone extraction amount AE2 of the rubber composition of the inner liner 7 is preferably less than 12%. With this configuration, it is possible to improve the air permeation resistance in the inner liner 7. It is noted that the lower limit value of the acetone extraction amount AE2 of the rubber composition of the inner liner 7 is not limited, and the lower the value is, the more preferable it is.

As the plasticizers contained in the inner liner 7 and the mount member 10, those commonly used in the tire industry can be used, and for example, a softening agent that causes the rubber composition to soften can be used. Examples of the plasticizer include oil, resins, a liquid polymer, and a low-temperature plasticizer. These may be used alone or in combination of two or more. In particular, the plasticizer is preferably oil or resins.

As the oil as the plasticizer, those generally used in the tire industry can be used. Examples of the oil include process oil, vegetable oil and fat, animal oil and fat, and mixtures thereof. It is noted that the process oil is preferably used since it is excellent in processability.

Examples of the process oil include paraffinic process oil (mineral oil), naphthenic process oil, and aromatic process oil (aroma oil). In particular, the mineral oil is preferable.

Examples of the vegetable oil and fat include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil.

Examples of the animal oil and fat include oleyl alcohol, fish oil, and beef tallow.

The oil may be a commercial product of Idemitsu Kosan Co., Ltd., Sankyo Yuka Kogyo K. K., ENEOS Corporation, Olisoy, H&R, Hokoku Corporation, Showa Shell Sekiyu K. K., and Fuji Kosan Co., Ltd.

The resins as the plasticizer are not particularly limited, and those generally used in the tire industry can be used. Examples of the resins include: liquid resin that maintains its liquid state at 25° C.; and solid resin that maintains its solid state at 25° C.

The liquid resin is not particularly limited, and examples thereof include liquid aromatic vinyl polymer, liquid coumarone indene resin, liquid indene resin, liquid terpene resin, liquid rosin resin, and hydrogenated products of these.

Examples of the liquid aromatic vinyl polymer include resins obtained by polymerizing α-methylstyrene and/or styrene. Specifically, the examples include liquid resins such as a monopolymer of styrene, a monopolymer of α-methylstyrene, and a copolymer of α-methylstyrene and styrene.

The liquid coumarone indene resin is a resin that contains coumarone and indene as main monomer components constituting the skeleton (main chain) of the resin. Examples of the monomer components, other than coumarone and indene, that may be contained in the skeleton include liquid resins such as styrene, α-methylstyrene, methylindene, and vinyl toluene.

The liquid indene resin is a liquid resin that contains indene as a main monomer component constituting the skeleton (main chain) of the resin.

The liquid terpene resin is a liquid terpene-based resin (a terpene phenolic resin, an aromatic modified terpene resin, etc.) represented by terpene phenol that is a resin obtained by polymerizing a terpene compound such as α-pinene, (β-pinene, camphor, and dipentene, or a resin obtained from a terpene compound and a phenolic compound as raw materials.

Examples of the liquid rosin resin include liquid rosin-based resins represented by natural rosin, polymerized rosin, modified rosin, ester compounds of these, and hydrogenated materials of these.

The solid resin is not particularly limited, and examples thereof include aromatic vinyl polymer, coumarone indene resin, indene resin, rosin resin, terpene resin, and acrylic resin.

The liquid polymer as the plasticizer is not particularly limited, and those commonly used in the tire industry can be used. Examples of the liquid polymer include liquid SBR, liquid BR, liquid IR, and liquid SIR.

The low-temperature plasticizer as the plasticizer is not particularly limited, and those commonly used in the tire industry can be used. Examples of the low-temperature plasticizer include ester plasticizers such as dibutyl adipate (DBA), diisobutyl adipate (DIBA), dioctyl adipate (DOA), azelaic acid di2-ethylhexyl (DOZ), dibutyl sebacate (DBS), diisononyl adipate (DINA), diethyl phthalate (DEP), dioctyl phthalate (DOP), diundecyl phthalate (DUP), dibutyl phthalate (DBP), dioctyl sebacate (DOS), tributyl phosphate (TBP), trioctyl phosphate (TOP), triethyl phosphate (TEP), trimethyl phosphate (TMP), thymidine triphosphate (TTP), tricresyl phosphate (TCP), and trixylenyl phosphate (TXP).

In the present embodiment, the area (attachment area) of an attachment surface in the mounting area A1 of the inner surface 7A of the inner liner 7 to which the mount member 10 is attached, is preferably 75 $cm^2$ or less. It is considered that when the area (attachment area) of the attachment surface to which the mount member 10 is attached is 75 $cm^2$ or less, it is possible to prevent more effectively the reduction of air leak resistance at the part of the inner liner 7 to which the mount member 10 is attached. In addition, it is considered that since the contact area between the mount member 10 and the inner liner 7 becomes smaller, the force variation (PV) of the tire 1 can be improved and the plasticizer hardly moves from the mount member 10 to the inner liner 7. It is noted that the lower-limit value of the area of the attachment surface to which the mount member 10 is attached is not limited, and the smaller the area is, the more preferable it is.

In addition, it is preferable that complex elastic modulus E*2 at 70° C. of the rubber composition of the inner liner 7 and complex elastic modulus E*1 at 70° C. of the rubber composition of the mount member 10 satisfy the relationship represented by the formula (1) shown below.

$$0.5 \cdot E^*2 \leq E^*1 \leq 3.0 \cdot E^*2 \quad (1)$$

In the present embodiment, as described above, when the complex elastic modulus E*1 at 70° C. of the rubber composition constituting the mount member 10 is less than 0.5 times the complex elastic modulus E*2, the mount member 10 is too higher in hardness than the inner liner 7, and there is a tendency not to restrict a reduction of air leak resistance at the part to which the mount member 10 is attached. In addition, when the complex elastic modulus E*1 is more than 3.0 times the complex elastic modulus E*2, the mount member 10 is too lower in hardness than the inner liner 7, and in this case, too, there is a tendency not to restrict a reduction of air leak resistance at the part to which the mount member 10 is attached. Therefore, it is expected that when the complex elastic modulus E*1 and the complex elastic modulus E*2 satisfy the relationship represented by the above-described formula (1), a reduction of air leak resistance at the part of the inner liner 7 to which the mount member 10 is attached can be effectively restricted.

It is noted that the complex elastic moduli E*1 and E*2 are measurement values measured on the test pieces of the mount member 10 and the inner liner 7 by a predetermined viscoelastic spectrometer (viscoelasticity measuring device), and, for example, can be measured under measurement conditions: measurement temperature of 70° C., initial strain of 5%, dynamic strain of ±1%, frequency of 10 Hz, and stretch deformation mode.

In general, the complex elastic moduli E* of the rubber composition can be adjusted by changing the type or shape of blended reinforcing agent such as carbon black or silica. In the present embodiment, too, it is possible to adjust the complex elastic moduli E*1 and E*2 to satisfy the relationship represented by the above-described formula (1) by appropriately changing the type or blend ratio of each material constituting each rubber composition of the inner liner 7 and the mount member 10, or the type or shape of the reinforcing agent.

It is noted that in the present embodiment, a complex elastic modulus E* at 70° C. is used as an index in each of the mount member 10 and the inner liner 7 since the inner temperature of the tire 1 reaches approximately 70° C. during a high-speed travelling on a dry road surface. However, the complex elastic modulus E* as the index is not limited to one at 70° C. It is preferable that the complex elastic moduli E*2 of the rubber composition of the inner liner 7 and the complex elastic moduli E*1 of the rubber composition of the mount member 10 satisfy the relationship represented by the above-described formula (1) at any set temperature in a temperature range from 0° C. or more to 70° C. or less.

In addition, in the tire 1, loss tangent tan δ (=E''/E') at 70° C. of the rubber composition constituting the inner liner 7 is preferably 0.18 or less. Hereinafter, loss tangent tan δ at 70° C. of the inner liner 7 is denoted as tan δ·70° C. In addition, tan δ·70° C. at 70° C. of the rubber composition constituting the inner liner 7 is more preferably 0.15 or less.

When the vehicle travels on the road surface, the inner temperature of the tire 1 increases, and the kinetic property of molecules of the rubber compositions constituting the inner liner 7 and the mount member 10 increases. In this case, it becomes easy for the plasticizer bled from the mount member 10 due to deterioration over time to move to the inner liner 7. However, by setting the loss tangent tan δ at 70° C. of the inner liner 7 to 0.18 or less, more preferably to 0.15 or less, it is possible to reduce lost elastic modulus E'' (viscosity item) with respect to storage elastic modulus E' (elastic item) in the rubber composition of the inner liner 7, thereby reducing the viscosity (fluidity). It is considered that this reduces the heat build-up in the inner liner 7 and restricts the plasticizer from moving to the inner liner 7.

The lower limit value of the loss tangent tan δ·70° C. of the inner liner 7 is not limited, and the lower the value is, the more preferable it is. It is noted that the loss tangent tan δ·70° C. is a measurement value measured on the test pieces of the mount member 10 and the inner liner 7 by a predetermined viscoelastic spectrometer (viscoelasticity measuring device), and, for example, can be measured under measurement conditions: measurement temperature of 70° C., initial strain of 10%, dynamic strain of ±2.5%, frequency of 10 Hz, and stretch deformation mode.

In general, the loss tangent tan δ can be adjusted by changing the type or shape of blended reinforcing agent or blend amount thereof. In addition, it can be adjusted by changing the blend amount of the plasticizer such as oil. In the present embodiment, too, it is possible to adjust the loss tangent tan δ·70° C. to arbitrary values by appropriately changing the type or blend ratio of each material constituting each rubber composition of the inner liner 7 and the mount member 10, as well as the type or shape, or the blend amount of the reinforcing agent, or the blend amount of the plasticizer.

The tire 1 according to an embodiment of the present disclosure has been described up to now. However, the present disclosure is not limited to the above-described embodiment. The following describes examples of the tire 1 of the present embodiment and comparative examples, with reference to Tables 1 and 2.

EXAMPLES

In Examples 1 to 6 and Comparative Examples 1 to 5 described in the following, the tires are pneumatic tires similar to the tire 1 described above, and the blend ratios of each material constituting the rubber compositions of parts, except for the inner liner 7 and the mount member 10, are substantially the same.

In addition, the tires of Examples 1 to 6 and Comparative Examples 1 to 5 each have the same configuration as the above-described tire 1. That is, the mount member 10 is mounted to the mounting area A1 on the inner surface 7A corresponding to the crown land portion 24A.

Table 1 shows blend information R1 to R6 of the inner liner 7 and blend information R7 to R12 of the mount member 10 in each tire of Examples 1 to 6 and Comparative Examples 1 to 5. Each of the blend information R1 to R12 includes blend ratios of rubber compositions and predetermined physical property values of the corresponding members.

TABLE 1

| | | Blend information of inner liner | | | | | | Blend information of mount member | | | | | |
|---|---|---|---|---|---|---|---|---|---|---|---|---|---|
| | | R1 | R2 | R3 | R4 | R5 | R6 | R7 | R8 | R9 | R10 | R11 | R12 |
| Rubber material | NR | 10 | 10 | 10 | 10 | 10 | 10 | 40 | 40 | 40 | 40 | 40 | 40 |
| | BR-IIR | 90 | 90 | 90 | 90 | 90 | 90 | 0 | 0 | 0 | 0 | 0 | 0 |
| | SBR | 0 | 0 | 0 | 0 | 0 | 0 | 60 | 60 | 60 | 60 | 60 | 60 |
| Additive | Reinforcing agent 1 | | | | | | | 3 | 3 | 3 | 3 | 5 | 3 |
| | Reinforcing agent 2 | 60 | 60 | 60 | 45 | 30 | 50 | | | | | | |
| | Reinforcing agent 3 | | | | | | | 60 | 60 | 55 | 45 | 60 | 50 |
| | Reinforcing agent 4 | 15 | 15 | 25 | 20 | 20 | 20 | 30 | 30 | 30 | 30 | 30 | 30 |

TABLE 1-continued

| | | Blend information of inner liner | | | | | | Blend information of mount member | | | | | |
|---|---|---|---|---|---|---|---|---|---|---|---|---|---|
| | | R1 | R2 | R3 | R4 | R5 | R6 | R7 | R8 | R9 | R10 | R11 | R12 |
| | Plasticizer | 7 | 10 | 12 | 5 | 2 | 12 | 9 | 14 | 3 | 3 | 16 | 7 |
| | Anti-aging agent 1 | | | | | | | 1 | 1 | 1 | 1 | 1 | 1 |
| | Anti-aging agent 2 | 1 | 1 | 1 | 1 | 1 | 1 | 1 | 1 | 1 | 1 | 1 | 1 |
| | Compatibilizing agent | 10 | 10 | 10 | 5 | 5 | 10 | | | | | | |
| | Stearic acid | 1.5 | 1.5 | 2.0 | 1.5 | 1.5 | 1.5 | 1.2 | 1.2 | 2.0 | 2.0 | 3.0 | 2.0 |
| | Zinc oxide | 1.5 | 1.5 | 2.0 | 2.0 | 1.5 | 1.0 | 2.0 | 2.0 | 2.0 | 2.0 | 2.0 | 2.0 |
| | Sulfur | 0.5 | 0.5 | 0.8 | 0.5 | 0.5 | 0.5 | 1.2 | 1.2 | 1.2 | 1.0 | 2.0 | 1.0 |
| | Coupling agent | | | | | | | 5.0 | 5.0 | 4.2 | 4.0 | 5.0 | 4.5 |
| | Vulcanization accelerator 1 | 1.20 | 1.20 | 1.20 | 1.25 | 1.25 | 1.00 | | | | | | |
| | Vulcanization accelerator 2 | | | | | | | 1.5 | 1.5 | 1.5 | 1.0 | 1.8 | 1.0 |
| | Vulcanization accelerator 3 | | | | | | | 1.0 | 1.0 | 1.0 | 1.2 | 1.2 | 1.0 |
| | Total parts by mass | 197.7 | 200.7 | 214.0 | 181.3 | 162.8 | 197.0 | 215.9 | 220.9 | 204.9 | 194.2 | 228.0 | 203.5 |
| Physical property | AE | 10.4% | 11.8% | 12.1% | 7.5% | 8.2% | 13.2% | 9.2% | 11.3% | 7.0% | 7.2% | 12.5% | 8.8% |
| | E* (70° C.) | 3.8 | 3.6 | 3.9 | 3.5 | 2.8 | 2.9 | 9.7 | 9.0 | 10.0 | 8.0 | 11.1 | 8.0 |
| | tanδ · 70° C. | 0.20 | 0.20 | 0.18 | 0.17 | 0.14 | 0.19 | | | | | | |

As shown in Table 1, each of the blend information R1 to R12 shows blend ratios of a plurality of rubber materials, blend ratios of a plurality of additives, and physical property values of three physical properties. Here, the blend ratio represents, by parts by mass, the blend amount of each material (rubber materials and additives). Specifically, the blend ratio of each material indicates a ratio of the blend amount (parts by mass) of each material when the total parts by mass of one or more types of rubber materials (rubber components) is assumed to be 100. The unit of the blend ratio is represented by phr (per hundred rubber). In addition, the physical properties shown in Table 1 are: acetone extraction amount AE; complex elastic modulus E* at 70° C.; and loss tangent tan δ·70° C. at 70° C.

Details of the various blend materials (the various blend materials shown in Table 1) used in the rubber compositions constituting the inner liner 7 and the mount member 10 are as follows.

(1) Rubber materials (a) IIR: chlorobutyl HT1066 manufactured by Exxon Mobil Corporation (b) BR-IIR: Bromobutyl 2222 manufactured by Exxon Mobil Corporation (c) SBR: SBR 1502 manufactured by JSB (2) Additives (a) Reinforcing agent 1 (carbon black): DIABLACK N220 manufactured by Mitsubishi Chemical Corporation (b) Reinforcing agent 2 (carbon black): STERLING@V manufactured by Cabot K. K.

(c) Reinforcing agent 3 (silica): "Zeosil 1115MP" manufactured by Rhodia (d) Reinforcing agent 4 (calcium carbonate): Calcium Carbonate #200 manufactured by Takehara Kagaku Kogyo Co., Ltd.

(e) Plasticizer (mineral oil): Diana Process Oil PA-32 manufactured by Idemitsu Kosan Co., Ltd.

(f) Anti-aging agent 1 (6C): Antigen 6C (N-(1,3-dimethylbutyl)-N'-phenyl-p-phenylenediamine) manufactured by Sumitomo Chemical Co., Ltd.

(g) Anti-aging agent 2 (RD): Antioxidant TMQ manufactured by Kemai Chemical Industry Co., Ltd.

(h) Compatibilizing agent: PROMIX400 manufactured by Flow Polymers, LLC (i) Stearic acid: camellia oil manufactured by NOF Corporation (j) Zinc oxide: two types of zinc oxides manufactured by Mitsui Mining & Smelting Co., Ltd.

(k) Sulfur 5% oil sulfur manufactured by Tsurumi Chemical Industry Co., Ltd.

(l) Coupling agent: compound silane coupling agent Si266 manufactured by Momentive Performance Materials (m) Vulcanization accelerator 1: NOCCELER DM-G (mercaptobenzothiazole disulfide) manufactured by Ouchi Shinko Chemical Industrial Co., Ltd.

(n) Vulcanization accelerator 2: NOCCELER CZ (N-cyclohexyl-2-benzothiazolyl sulfenamide) manufactured by Ouchi Shinko Chemical Industrial Co., Ltd.

(o) Vulcanization accelerator 3: NOCCELER DPG (diphenylguanidine) manufactured by Ouchi Shinko Chemical Industrial Co., Ltd.

The tires of the examples and the comparative examples were manufactured as follows. First, the additives and the rubber materials other than sulfur and vulcanization accelerators were blended in accordance with the ratios shown in blend information R1 to R6 of Table 1, and were kneaded for four minutes using a Banbury mixer under the temperature condition of approximately 130° C. Next, sulfur and the vulcanization accelerators were added to the obtained kneaded material in accordance with the ratios shown in Table 1, and were kneaded for four minutes using an open roll under the temperature condition of approximately 80° C., thereby obtaining unvulcanized rubber compositions. The unvulcanized rubber compositions thus obtained were extruded and molded in a shape of the tread portion 2. They were adhered to the inner liner 7 and the other tire members on a tire molding machine to form unvulcanized tires. The unvulcanized tires were press-vulcanized for 10 minutes under the temperature condition of 170° C., thereby manufacturing test tires (tire size: 205155R16 91V, maximum load capacity: 615 kg).

In addition, the mount members 10 included in the tires of the examples and the comparative examples were manufactured as follows. First, the additives and the rubber materials other than sulfur and the vulcanization accelerators were blended in accordance with the ratios shown in blend information R7 to R12 of Table 1, and were kneaded for four minutes using a predetermined mixer under the temperature condition of approximately 130° C. Next, sulfur and the vulcanization accelerators were added to the obtained kneaded materials in accordance with the ratios shown in Table 1, and were kneaded for four minutes under the temperature condition of approximately 80° C., thereby obtaining unvulcanized rubber compositions. The unvulcanized rubber compositions thus obtained were extruded and molded in a shape of the mount member 10, and they were vulcanized for 10 minutes under the temperature condition of 170° C., thereby manufacturing the mount members 10.

The manufactured mount members 10 are fixed to the inner surfaces of the tires of the examples and the comparative examples together with the electric equipment by the above-described mounting method. It is noted that the weight of each obtained tire, including the weight of the electric equipment and the mount member 10, was in the range of 7.7 kg±0.2 kg.

It is noted that the values of complex elastic modulus E* and loss tangent tan δ shown in Table 1 were obtained by preparing test pieces having the same configuration as the rubber composition of the inner liner 7 and test pieces having the same configuration as the rubber composition of the mount member 10, and performing a measurement on each of the test pieces as follows. The size of each test piece was 20 mm in long side, 4 mm in width, and 1 mm in thickness. It is noted that the test pieces of the inner liner 7 may be sample pieces of the rubber composition that are cut out from the test tires. With regard to the size of each test piece, the long side corresponds to the peripheral direction D3 (see FIG. 1) of the tire, and the thickness corresponds to the thickness direction of the tire. The complex elastic modulus E* and the loss tangent tan δ of the test pieces of the inner liner 7 and the mount member 10 were measured by using "Eplexor (registered trademark)", a viscoelasticity measuring device manufactured by GABO (Germany). The values of the complex elastic moduli E* were obtained by performing the measurements in the temperature environment of measurement temperature of 70° C., under measurement conditions: initial strain of 5%, dynamic strain of ±1%, frequency of 10 Hz, and stretch deformation mode. In addition, the values of the loss tangent tan δ were obtained by performing the measurements in the temperature environment of measurement temperature of 70° C., under measurement conditions: initial strain of 10%, dynamic strain of ±2.5%, frequency of 10 Hz, and stretch deformation mode. It is noted that when measurements were performed on the same rubber composition, an average value of a plurality of measurements was calculated and written.

In addition, Table 2 and Table 3 show the blend information (R1 to R12) of the inner liner 7 and the mount member 10, the difference ΔA (=AE2−AE1) between the acetone extraction amounts AE of the inner liner 7 and the mount member 10, the attachment area for attaching the mount member 10, whether or not the above-described formula (1) is satisfied, the loss tangent·70° C., evaluation values of air leak test, and evaluation of travelling test.

TABLE 2

| | Part | Blend | Δ A | AE2 | Attachment area (cm2) | 0.5E*2 ≤ E*1 ≤ 3.0E*2 | tan δ (70° C.) | Air leak test |
|---|---|---|---|---|---|---|---|---|
| Example 1 | Inner liner | R6 | 1.9% | 13.2% | 78.50 | x | 0.19 | 105 |
| | Mount member | R8 | | | | | | |
| Example 2 | Inner liner | R2 | 4.8% | 11.8% | 78.50 | ○ | 0.20 | 106 |
| | Mount member | R9 | | | | | | |
| Example 3 | Inner liner | R2 | 4.8% | 11.8% | 28.26 | ○ | 0.20 | 107 |
| | Mount member | R9 | | | | | | |
| Example 4 | Inner liner | R1 | 1.2% | 10.4% | 28.26 | ○ | 0.20 | 109 |
| | Mount member | R7 | | | | | | |
| Example 5 | Inner liner | R4 | 0.5% | 7.5% | 28.26 | ○ | 0.17 | 112 |
| | Mount member | R9 | | | | | | |
| Example 6 | Inner liner | R5 | 1.0% | 8.2% | 28.26 | ○ | 0.14 | 115 |
| | Mount member | R10 | | | | | | |

TABLE 3

| | Part | Blend | Δ A | AE2 | Attachment area (cm2) | 0.5E*2 ≤ E*1 ≤ 3.0E*2 | tan δ (70° C.) | Air leak test |
|---|---|---|---|---|---|---|---|---|
| Comparative | Inner liner | R2 | −0.7% | 11.8% | 78.26 | x | 0.20 | 94 |
| Example 1 | Mount member | R11 | | | | | | |
| Comparative | Inner liner | R2 | −0.7% | 11.8% | 28.26 | x | 0.20 | 100 |
| Example 2 | Mount member | R11 | | | | | | |
| Comparative | Inner liner | R3 | −0.4% | 12.1% | 28.26 | ○ | 0.18 | 96 |
| Example 3 | Mount member | R11 | | | | | | |
| Comparative | Inner liner | R4 | −3.8% | 7.5% | 28.26 | ○ | 0.17 | 97 |
| Example 4 | Mount member | R8 | | | | | | |
| Comparative | Inner liner | R5 | −0.6% | 8.2% | 28.26 | ○ | 0.14 | 99 |
| Example 5 | Mount member | R12 | | | | | | |

It is noted that in Table 2 and Table 3, "o" indicates that the complex elastic moduli E*1 satisfies the relationship of the formula (1), and "X" indicates that the complex elastic moduli E*1 does not satisfy the relationship of the formula (1). In addition, the air leak test was performed in compliance with ASTM F1112, and evaluation points of each Example and each Comparative Example were calculated.

In Table 2 and Table 3, the evaluation points of Comparative Example 1 were assumed to be 100, and the evaluation points of the other Examples and Comparative Examples were indexed.

As shown in Table 2 and Table 3, in each of Examples 1 to 6, the difference ΔA (=AE2−AE1) between the acetone extraction amounts AE is plus. That is, the acetone extraction amount AE2 of the inner liner 7 is larger than the acetone extraction amount AE1 of the mount member 10. On the other hand, in each of Comparative Examples 1 to 5, the difference ΔA (=AE2−AE1) between the acetone extraction amounts AE is minus. That is, the acetone extraction amount AE2 of the inner liner 7 is smaller than the acetone extraction amount AE1 of the mount member 10.

As shown in Table 2, when the acetone extraction amount AE2 of the inner liner 7 is larger than the acetone extraction amount AE1 of the mount member 10, the reduction of air permeation resistance at the part of the mounting area A1 of the inner liner 7 to which the mount member 10 is attached is restricted, and it is expected that the reduction of air leak resistance at the part of the inner liner 7 is prevented.

The embodiment of the present disclosure described above includes the following disclosure items (1) to (15).

Present disclosure (1) is a tire including: a tread portion constituting a tire surface; an inner liner constituting a tire inner surface; and a mount member which is provided on the tire inner surface, and to which electric equipment can be attached. Each of a first rubber composition constituting the mount member and a second rubber composition constituting the inner liner contains a plasticizer. Acetone extraction amount AE2 of the second rubber composition is larger than acetone extraction amount AE1 of the first rubber composition.

With the above-described configuration, even when the plasticizer contained in the rubber composition of the mount member bleeds due to a long use, the plasticizer hardly transfers to the inner liner. This prevents the part of the inner liner to which the mount member is mounted and its surroundings from becoming softer than the other parts. As a result, it is possible to prevent a reduction of air permeation resistance due to softening of the part, and prevent a reduction of air leak resistance at the part.

Present disclosure (2) is the tire according to the present disclosure (1), wherein the acetone extraction amount AE2 of the second rubber composition is less than 12%.

With the above-described configuration, it is possible to improve the air permeation resistance in the inner liner. In addition, by setting the acetone extraction amount AE2 of the second rubber composition to less than 12%, it is possible to improve not only the air permeation resistance in the inner liner, but also the air permeation resistance at surroundings of a part to which the mount member is attached.

Present disclosure (3) is the tire according to the present disclosure (1) or (2), wherein an area of an attachment surface in the tire inner surface of the inner liner to which the mount member is attached is 75 $cm^2$ or less.

With the above-described configuration, it is possible to improve the force variation (PV) of the tire, and the plasticizer hardly moves from the mount member to the inner liner. Accordingly, the smaller the area of the mount member in contact with the inner liner is, the more preferable it is.

Present disclosure (4) is the tire according to any one of the present disclosures (1) to (3), wherein complex elastic modulus E*2 at 70° C. of the second rubber composition measured under measurement conditions: measurement temperature of 70° C., initial strain of 5%, dynamic strain of ±1%, frequency of 10 Hz, and stretch deformation mode and complex elastic modulus E*1 at 70° C. of the first rubber composition measured under the measurement conditions satisfy a formula shown below:

$$0.5 \cdot E^{*}2 \leq E^{*}1 \leq 3.0 \cdot E^{*}2$$

By defining the rigidity difference between the mount member and the inner liner to be in the above-described range, it is possible to reduce the rigidity difference. This restricts occurrence of cracks or tears that may occur due to the rigidity difference, and the plasticizer hardly moves from the mount member to the inner liner.

Present disclosure (5) is the tire according to any one of the present disclosures (1) to (4), wherein loss tangent tan δ at 70° C. of the second rubber composition measured under measurement conditions: measurement temperature of 70° C., initial strain of 10%, dynamic strain of ±2.5%, frequency of 10 Hz, and stretch deformation mode is 0.18 or less.

With the above-described configuration, it is possible to prevent the heat build-up in the inner liner 7, thereby restricting the plasticizer from moving from the mount member to the inner liner.

Present disclosure (6) is the tire according to any one of the present disclosures (1) to (4), wherein loss tangent tan δ at 70° C. of the second rubber composition measured under measurement conditions: measurement temperature of 70° C., initial strain of 10%, dynamic strain of ±2.5%, frequency of 10 Hz, and stretch deformation mode is 0.15 or less.

With the above-described configuration, it is possible to further prevent the heat build-up in the inner liner 7, thereby further restricting the plasticizer from moving from the mount member to the inner liner.

Present disclosure (7) is the tire according to any one of the present disclosures (1) to (6), wherein the mount member is disposed on the tire inner surface at a position corresponding to a center part of the tread portion in a width direction.

Present disclosure (8) is the tire according to the present disclosure (7), wherein the mount member is disposed on the tire inner surface at a position where a straight line that passes through a center of the center part of the tread portion in the width direction coincides with a center of the mount member.

Present disclosure (9) is the tire according to any one of the present disclosures (1) to (8), wherein the tread portion includes a land portion divided by a recessed groove formed on the tire surface, and the mount member is disposed on the tire inner surface at a position corresponding to the land portion.

Present disclosure (10) is the tire according to any one of the present disclosures (1) to (9), wherein the mount member includes: a mounting seat portion fixed to the tire inner surface; and a main body portion to which the electric equipment is attached in a detachable manner.

Present disclosure (11) is the tire according to any one of the present disclosures (1) to (10), wherein the mount member is welded to the tire inner surface.

Present disclosure (12) is the tire according to any one of the present disclosures (1) to (11), wherein a plurality of mount members are provided on the tire inner surface, and the plurality of mount members are arranged on the tire inner surface at equal intervals along a peripheral direction of the tire.

Present disclosure (13) is the tire according to any one of the present disclosures (1) to (12), wherein the electric equipment is a sensor, a wireless communication relay, or a signal transmitter.

Present disclosure (14) is the tire according to any one of the present disclosures (1) to (13), wherein the tire is a tire for passenger car.

Present disclosure (15) is the tire according to any one of the present disclosures (1) to (14), wherein the tire is a pneumatic tire.

The invention claimed is:

1. A tire comprising: a tread portion constituting a tire surface; an inner liner constituting a tire inner surface; and a mount member which is provided on the tire inner surface, and to which an electronic device can be attached, wherein the mount member includes: a mounting seat portion fixed to the tire inner surface; and a main body portion to which the electronic device is attached in a detachable manner, each of a first rubber composition constituting the mounting seat portion of the mount member and a second rubber composition constituting the inner liner contains a plasticizer, an acetone extraction amount AE2 of the second rubber composition is larger than an acetone extraction amount AE1 of the first rubber composition, the acetone extraction amount AE2 of the second rubber composition is less than 12%, a difference ΔA (AE2−AE1) between the acetone extraction amount AE2 of the second rubber composition and the acetone extraction amount AE1 of the first rubber composition is 0.5% or more and 4.8% or less, a complex elastic modulus E*1 at 70° C. of the first rubber composition and a complex elastic modulus E*2 at 70° C. of the second rubber composition measured under measurement conditions of a measurement temperature of 70° C., an initial strain of 5%, a dynamic strain of ±1%, a frequency of 10 Hz, and a stretch deformation mode, satisfy the following relationships (I) and (II): $E^*2<E^*1\leq 3.0\cdot E^*2$ (I) $8.3\geq E^*1-E^*2\geq 5.2$ (II).

2. The tire according to claim 1, wherein an area of an attachment surface in the tire inner surface of the inner liner to which the mount member is attached is 75 $cm^2$ or less.

3. The tire according to claim 1, wherein a loss tangent tan δ at 70° C. of the second rubber composition is 0.18 or less, wherein the loss tangent tan δ at 70° C. is measured under measurement conditions of a measurement temperature of 70° C., an initial strain of 10%, a dynamic strain of ±2.5%, a frequency of 10 Hz, and a stretch deformation mode.

4. The tire according to claim 1, wherein a loss tangent tan δ at 70° C. of the second rubber composition is 0.15 or less, wherein the loss tangent tan δ at 70° C. is measured under measurement conditions of a measurement temperature of 70° C., an initial strain of 10%, a dynamic strain of ±2.5%, a frequency of 10 Hz, and a stretch deformation mode.

5. The tire according to claim 1, wherein the mount member is disposed on the tire inner surface at a position corresponding to a center part of the tread portion in a width direction.

6. The tire according to claim 5, wherein the mount member is disposed on the tire inner surface at a position where a straight line that passes through a center of the center part of the tread portion in the width direction coincides with a center of the mount member.

7. The tire according to claim 1, wherein the tread portion includes a land portion divided by a recessed groove formed on the tire surface, and the mount member is disposed on the tire inner surface at a position corresponding to the land portion.

8. The tire according to claim 1, wherein the mount member is welded to the tire inner surface.

9. The tire according to claim 1, wherein a plurality of mount members are provided on the tire inner surface, and the plurality of mount members are arranged on the tire inner surface at equal intervals along a peripheral direction of the tire.

10. The tire according to claim 1, wherein the electronic device is a sensor, a wireless communication relay, or a signal transmitter.

11. The tire according to claim 1, wherein the tire is a tire for passenger car.

12. The tire according to claim 1, wherein the tire is a pneumatic tire.

13. The tire according to claim 1, wherein E*1 and E*2 satisfy $6.5\geq E^*1-E^*2\geq 5.2$.

* * * * *